(12) United States Patent
Lyngby et al.

(10) Patent No.: US 9,709,039 B2
(45) Date of Patent: Jul. 18, 2017

(54) LIGHTNING CURRENT TRANSFER UNIT FOR A WIND TURBINE

(71) Applicant: Vestas Wind Systems A/S, Aarhus N. (DK)

(72) Inventors: Claus Gron Lyngby, Braedstrup (DK); Kent Bach Lønbæk, Vejle (DK); Anders Niels Hansen, Langa (DK)

(73) Assignee: Vestas Wind Systems A/S, Aarhus N. (DK)

(*) Notice: Subject to any disclaimer, the term of this patent is extended or adjusted under 35 U.S.C. 154(b) by 337 days.

(21) Appl. No.: 14/406,380

(22) PCT Filed: Jun. 6, 2013

(86) PCT No.: PCT/DK2013/050176
§ 371 (c)(1),
(2) Date: Dec. 8, 2014

(87) PCT Pub. No.: WO2013/182202
PCT Pub. Date: Dec. 12, 2013

(65) Prior Publication Data
US 2015/0132133 A1    May 14, 2015

Related U.S. Application Data

(60) Provisional application No. 61/657,091, filed on Jun. 8, 2012.

(30) Foreign Application Priority Data

Jun. 28, 2012 (DK) .................................. 2012 70374

(51) Int. Cl.
F03D 11/00 (2006.01)
F03D 80/30 (2016.01)

(52) U.S. Cl.
CPC .......... F03D 11/0033 (2013.01); F03D 80/30 (2016.05); *F05D 2260/30* (2013.01); *Y02E 10/726* (2013.01)

(58) Field of Classification Search
CPC ..... F03D 80/30; F05B 2260/30; Y02E 10/726
See application file for complete search history.

(56) References Cited

U.S. PATENT DOCUMENTS 7,654,790 B2 * 2/2010 Molbech ................ H02G 13/00
                                                              415/1
8,643,997 B2 * 2/2014 Lyngby ................... F03D 80/30
                                                              361/117
(Continued)

FOREIGN PATENT DOCUMENTS

DE    4445899 A1    6/1996
EP    1036937 A2    9/2000
(Continued)

OTHER PUBLICATIONS

International Searching Authority, International Search Report and Written Opinion, issued in corresponding application PCT/DK2013/050176, dated Sep. 16, 2013, 8 pages.
(Continued)

*Primary Examiner* — Ninh H Nguyen
(74) *Attorney, Agent, or Firm* — Wood Herron & Evans LLP

(57) ABSTRACT

A lightning current transfer unit (100) for a wind turbine, the lightning current transfer unit (100) comprising a first portion (20a) configured to be electrically coupled to an electrically conducting portion of a blade of a wind turbine electrically connected to a down conductor of the blade and a second portion (20b) configured to be electrically coupled to an electrically conducting portion of a nacelle of the wind turbine connected to a down conductor connected to earth. The first portion (20a) and the second portion (20b) are both independently movable to maintain electrical coupling to the electrically conducting portion of the blade and nacelle respectively. A lightning current transfer portion (104) is provided that comprises a spark gap (106) formed between an electrical connection (108) to the first portion (20a) and an electrical connection (110) to the second portion (20b). The electrical connections (108, 110) are moveable with their respective first or second portion (20a, 20b). The spark gap (106) has a spark gap distance (111) and the lightning current transfer portion (104) is configured such that the
(Continued)

distance is substantially constant during movement of the first portion (20*a*), second portion (20*b*) and electrical connections and such that lightning current is transferred from the first portion (20*a*) to the second portion (20*b*).

15 Claims, 8 Drawing Sheets

(56) References Cited

U.S. PATENT DOCUMENTS

| | | | |
|---|---|---|---|
| 9,019,682 B2* | 4/2015 | Lyngby | F03D 11/0033 361/212 |
| 9,334,852 B2* | 5/2016 | Olsen | F03D 11/0033 |

FOREIGN PATENT DOCUMENTS

| | | |
|---|---|---|
| EP | 2336560 A1 | 6/2011 |
| EP | 2520796 A1 | 11/2012 |
| WO | 2005050008 A1 | 11/1995 |
| WO | 2004044419 A1 | 5/2004 |
| WO | 2012016568 A2 | 2/2012 |

OTHER PUBLICATIONS

Danish Patent and Trademark Office, Danish Search Report and Written Opinion issued in corresponding Danish Application PA 2012 70374, dated Feb. 6, 2013, 4 pages.

* cited by examiner

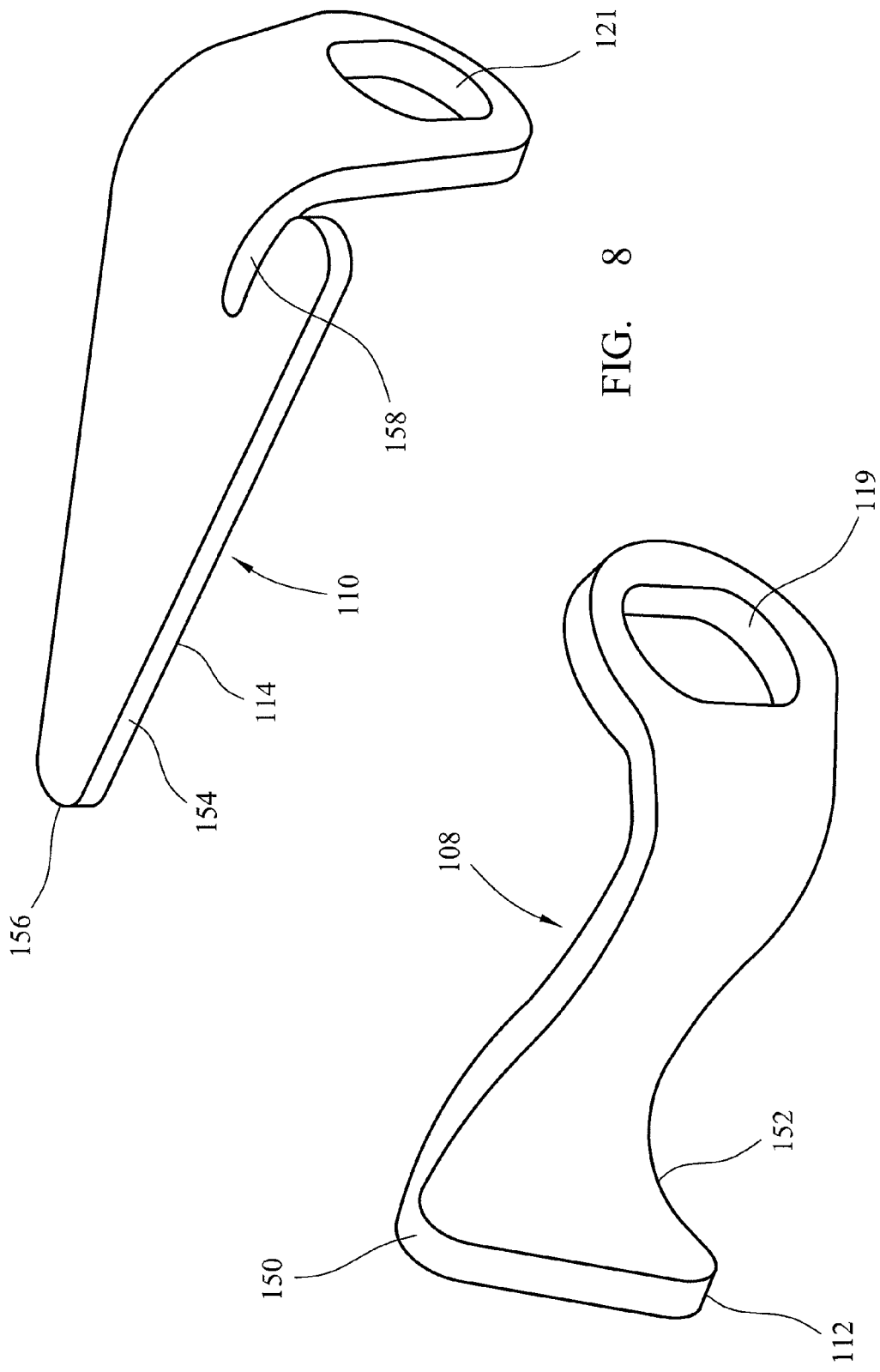

LIGHTNING CURRENT TRANSFER UNIT FOR A WIND TURBINE

The invention relates to a lightning current transfer unit (LCTU) for a wind turbine and, in particular, to a lightning current transfer unit for use in, but limited to use in, a wind turbine for large scale electricity generation on a wind farm.

BACKGROUND OF THE INVENTION

FIG. 1 illustrates a typical wind turbine 1 for use in large scale electricity generation on a wind farm. It includes a tower 2 and a wind turbine nacelle 3 positioned on top of the tower. The wind turbine rotor, comprising three wind turbine blades 5 connected to a hub 4, is connected to the nacelle through a main shaft (not shown in FIG. 1) which extends out of the nacelle front. Wind beyond a certain level activates the rotor due to lift induced on the blades and causes it to rotate. The rotation is converted to electric power, which is supplied to the electricity grid.

These tall wind turbines are located on exposed sites to maximize exposure to the wind, but they are also very exposed to lightning strikes which may cause extensive damage to a wind turbine. Thus, wind turbines are typically provided with a lightning protection system.

FIGS. 2a and 2b illustrate the typical lightning protection system in each of the wind turbine blades 5 (a single blade is shown in these Figures). The blades and, in particular, the tip of the blades are the most likely component of a wind turbine to be susceptible to a lightning strike as they are the component that project highest. Thus, the wind turbine blade 5 of FIG. 2a includes a tip with a metal receptor 8 that intercepts lightning strikes 7 that is grounded or earthed. The receptor is connected to a lightning down conductor 9 inside the wind turbine blade. The down conductor extends through the blade in the longitudinal direction and ends at the hub 4. FIG. 2b illustrates schematically one known arrangement in which lightning current is transferred from the lightning down conductor 9 to the rest of the lightning protection system and to ground. From the down conductor 9, the lightning current is transferred to the main shaft 10 of the wind turbine through a pitching mechanism 13 or any other mechanism between the blade and the shaft. In the nacelle 3, there are sliding contacts or slip rings in contact with the shaft in order to carry current from the shaft. The slip rings are connected to ground 11 by a down conductor extending through the wind turbine tower 1.

Problems with this type of arrangement are identified in International patent application No. WO 2005/050008 in the name of Vestas Wind Systems A/S (the same applicant/assignee as the present application). These include that the high energy of the lightning current passing through different components of the wind turbine such as the blade pitching mechanism 13 may damage these components and that the slip ring arrangement is inefficient.

International patent application No. WO 2005/050008 describes an improved lightning current transfer unit to address these problems. It is illustrated in FIGS. 3a to 6.

The lightning current transfer unit 15 of FIG. 3a forms an electrical connection between a lightning down conductor of each blade 5 of the rotor via an electrically conducting ring or blade band 18 around the outside of each blade of the wind turbine and a lightning down conductor of the nacelle 3 via an electrically conducting ring or lightning ring 16 on the nacelle.

As shown best in FIG. 3b, the lightning current transfer unit 15 is mounted on a protruding portion 21 of the hub 4 on the inside of the hub facing the nacelle 3. The lightning current transfer unit 15 projects outwardly between the inside surfaces of the hub and nacelle in a space between the wind turbine blade and the front of the nacelle. As the lightning connection means or lightning current transfer unit is mounted to the hub, it rotates with the hub.

Referring back to FIG. 3a, the electrically conducting or metal ring 18 around the outside of each blade 5 surrounds the root of the blade. Each ring forms a contact surface 18 on the root of the wind turbine above the pitching mechanism and perpendicular to the longitudinal direction of the blade. The contact surface thus rotates with pitching of the blade. Each ring is connected to the lightning down conductor 9 inside the wind turbine blade as described above.

The electrically conducting or metal ring 16 on the outside of the nacelle 3 facing the hub 4 is mechanically connected to the nacelle. It is electrically connected to a lightning down conductor 14 of the nacelle. The metal ring 16 forms a contact surface 17 to the lightning current transfer unit 15.

FIGS. 3b and 3c closer illustrate the position of the lightning current transfer unit 15 in relation to the contact surface 18 on the wind turbine blade and the contact surface 17 on the nacelle. It also illustrates the different sections of the lightning current transfer unit 15, which include a base support part 22, two contact means 19a, 19b and flexible links 26, 27 between the base support part and the two contact means. The flexible links ensure that the two contact means are forced against the contact surface 18 on the wind turbine blade 5 and the contact surface 17 of the nacelle 3, respectively. The two contact means 19 and the two contact surfaces 17,18 establish two contact areas 20a, 20b.

The first of the contact areas 20a ensures a constant contact to the electrically conducting ring 18 of the blade 5 and the other 20b to the electrically conducting ring 16 of the nacelle 3. The two contact means 19a, 19b are connected by a dedicated electric connection 30 in the form of a wire or cable.

Each of the contact means 19a, 19b also comprises a retaining bolt 28, 29 for the dedicated electric connection 30 allowing the electric connection to be established and retained between the two contact means. The electric connection 30 is made of a flexible material with a length corresponding to the distance between the two contact means at their rest position, when they are furthest apart. If the lightning connection means or lightning current transfer unit 15 is exposed to forces the flexible link will bend resulting in a more sagging dedicated electric connection 30.

FIG. 4 illustrates schematically the contact areas of the lightning connection means or lightning current transfer unit sliding on the conducting ring or lightning ring 17 of the nacelle 3. It illustrates the situation of a rotating three-bladed wind turbine rotor with three lightning connection means including contact means 20b. As each lightning connection means is mounted on the hub and main shaft 14 they will rotate with the main shaft as the centre of rotation. Further, the contact means is positioned at a distance from the centre corresponding to the diameter of the ring. The contact means will thus perform a circular rotation facing the ring while being continuously forced against the surface of the ring.

FIG. 5 illustrates the contact surface 18 of the blade 5. The contact means 20a is continuously forced against the contact surface or blade band and slides on the surface when the blade is pitched to one or the other side.

While this arrangement is effective as a lightning current transfer unit, it does not offer adequate electromagnetic compatibility (EMC) with other components of the wind turbine.

SUMMARY OF THE INVENTION

The invention in its various aspects is defined in the independent claims below. Advantageous features are defined in the dependent claims below.

The inventors of the present application have appreciated that adequate EMC or controlled EMC may be provided by a similar arrangement to that described in International patent application No. WO 2005/050008, but by providing a spark gap between the contact means 19a, 19b instead of the wire or cable of the prior art. The inventors have appreciated that the spark gap may not be directly between the lightning current transfer unit and the conducting blade band or directly between the lightning current transfer unit and the so-called lightning ring of the nacelle. Instead, in a preferred embodiment of the invention, a lightning current transfer portion is provided comprising a spark gap formed between an electrical connection to the first portion that has an electrical coupling to the blade and an electrical connection to the second portion that has an electrical coupling to the nacelle. The electrical connections being moveable with their respective first or second portion. The spark gap has a spark gap distance. The lightning current transfer portion is configured such that the distance is substantially constant during movement of the first portion, the second portion and electrical connections and such that lightning current is transferred from the first portion to the second portion.

A preferred embodiment of the invention is described in more detail below and takes the form of a lightning current transfer unit for a wind turbine, the lightning current transfer unit comprising a first portion configured to be electrically coupled to an electrically conducting portion of a blade of a wind turbine electrically connected to a down conductor of the blade and a second portion configured to be electrically coupled to an electrically conducting portion of a nacelle of the wind turbine connected to a down conductor connected to earth. The first portion and the second portion are both independently movable to maintain electrical coupling to the electrically conducting portion of the blade and nacelle respectively. A lightning current transfer portion is provided that comprises a spark gap formed between an electrical connection to the first portion and an electrical connection to the second portion. The electrical connections are moveable with their respective first or second portion. The spark gap has a spark gap distance and the lightning current transfer portion is configured such that the distance is substantially constant during movement of the first portion, second portion and electrical connections and such that lightning current is transferred from the first portion to the second portion.

In an aspect of the present invention, there is provided a lightning current transfer unit for a wind turbine, the lightning current transfer unit comprising: a first portion configured to be electrically coupled to an electrically conducting portion of a blade of a wind turbine electrically connected to a down conductor of the blade; a second portion configured to be electrically coupled to an electrically conducting portion of a nacelle of the wind turbine connected to a down conductor connected to earth; the first portion and the second portion both being independently movable to maintain electrical coupling to the electrically conducting portion of the blade and nacelle respectively; and a lightning current transfer portion comprising a spark gap between an electrical connection to the first portion and an electrical connection to the second portion, wherein the spark gap has a spark gap distance and the lightning current transfer portion is configured such that the distance is substantially constant during movement of the first portion and the second portion and such that lightning current is transferred from the first portion to the second portion.

This is a simple arrangement that is cheap to produce.

The electrical connection to the first portion may comprise a first arm. The electrical connection to the second portion may comprise a second arm. The first arm or the second arm may comprise a first edge portion projecting between the blade and nacelle forming an edge of the spark gap. The other of the first arm or the second arm may comprise a second edge portion projecting towards the first edge portion forming another edge of the spark gap. The second edge portion may be narrower than the first edge portion. The spark gap distance may be the distance between the edges of the spark gap in a direction perpendicular to the edges. The spark gap distance may be between 5 mm and 6 mm. The first portion may be located on a first forcing arm that forces the first portion against the electrically conducting portion of the blade. The second portion may be located on a second forcing arm that forces the second portion against the electrically conducting portion of the nacelle. The first forcing arm may be located on a hub of the wind turbine. The second forcing arm may be located on a hub of the wind turbine. The force that forces the first forcing arm may be provided by a first resilient portion. The first resilient portion may be located at the hub end of the first forcing arm. The force that forces the second forcing arm may be provided by a second resilient portion. The second resilient portion may be located at the hub end of the second forcing arm. The first portion and the second portion may each be movable in two dimensions.

BRIEF DESCRIPTION OF THE DRAWINGS

Preferred embodiments of the invention will now be described, by way of example, and with reference to the drawings in which:

FIG. 3b (prior art) is an enlarged portion of FIG. 3a;

FIG. 4 (prior art) is a view of a portion of the known wind turbine of FIG. 3a;

FIG. 5 (prior art) is a view of another portion of the known wind turbine of FIG. 3a;

FIG. 7 is a perspective view of a portion of a lightning current transfer unit embodying an aspect of the present invention;

FIG. 8 is a perspective view of another portion of a lightning current transfer unit embodying an aspect of the present invention.

DETAILED DESCRIPTION OF PREFERRED EMBODIMENTS

Figure 1:
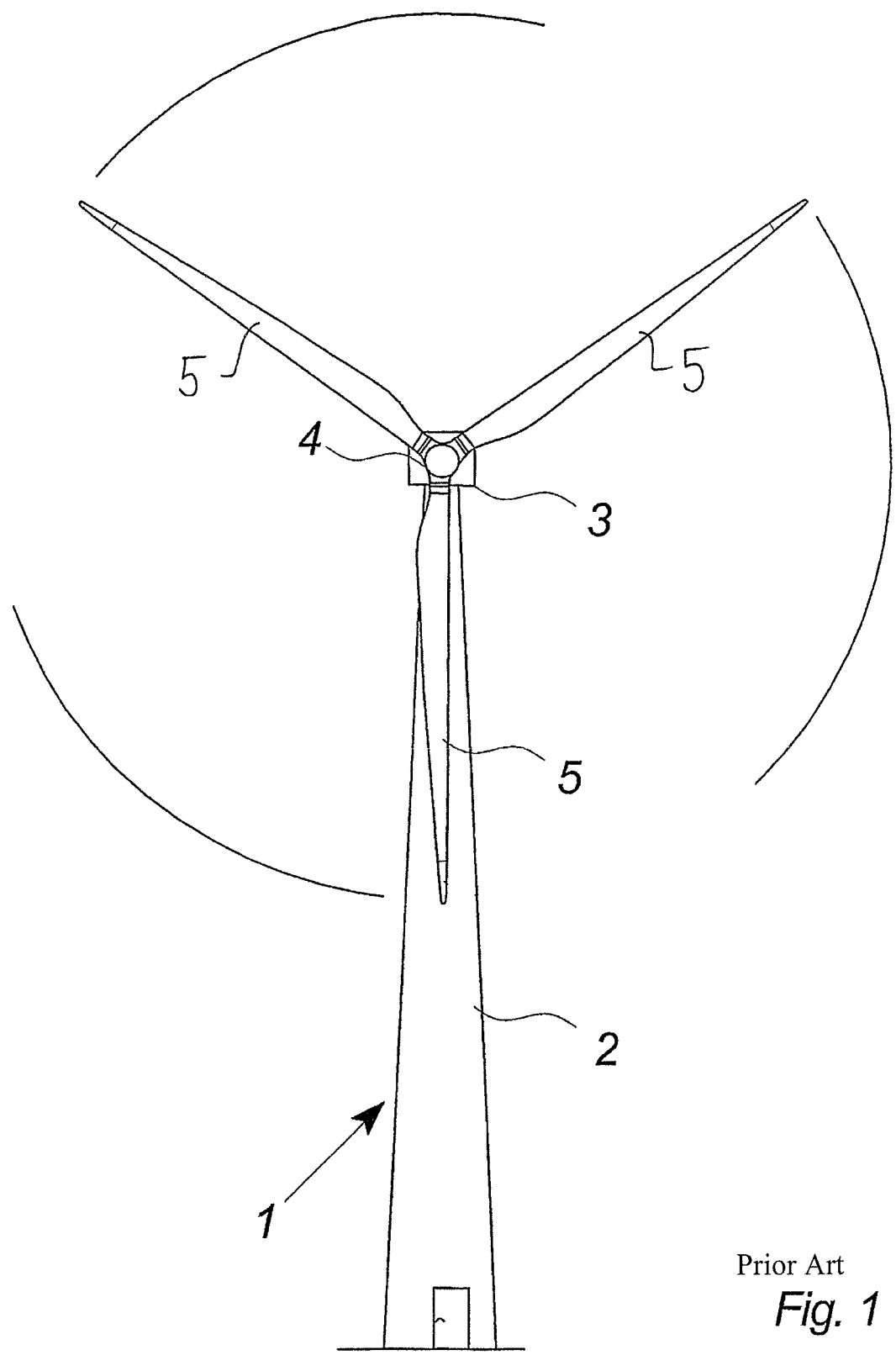
FIG. 1 (prior art) is a front view of a known wind turbine.
Figures 2A, 2B:
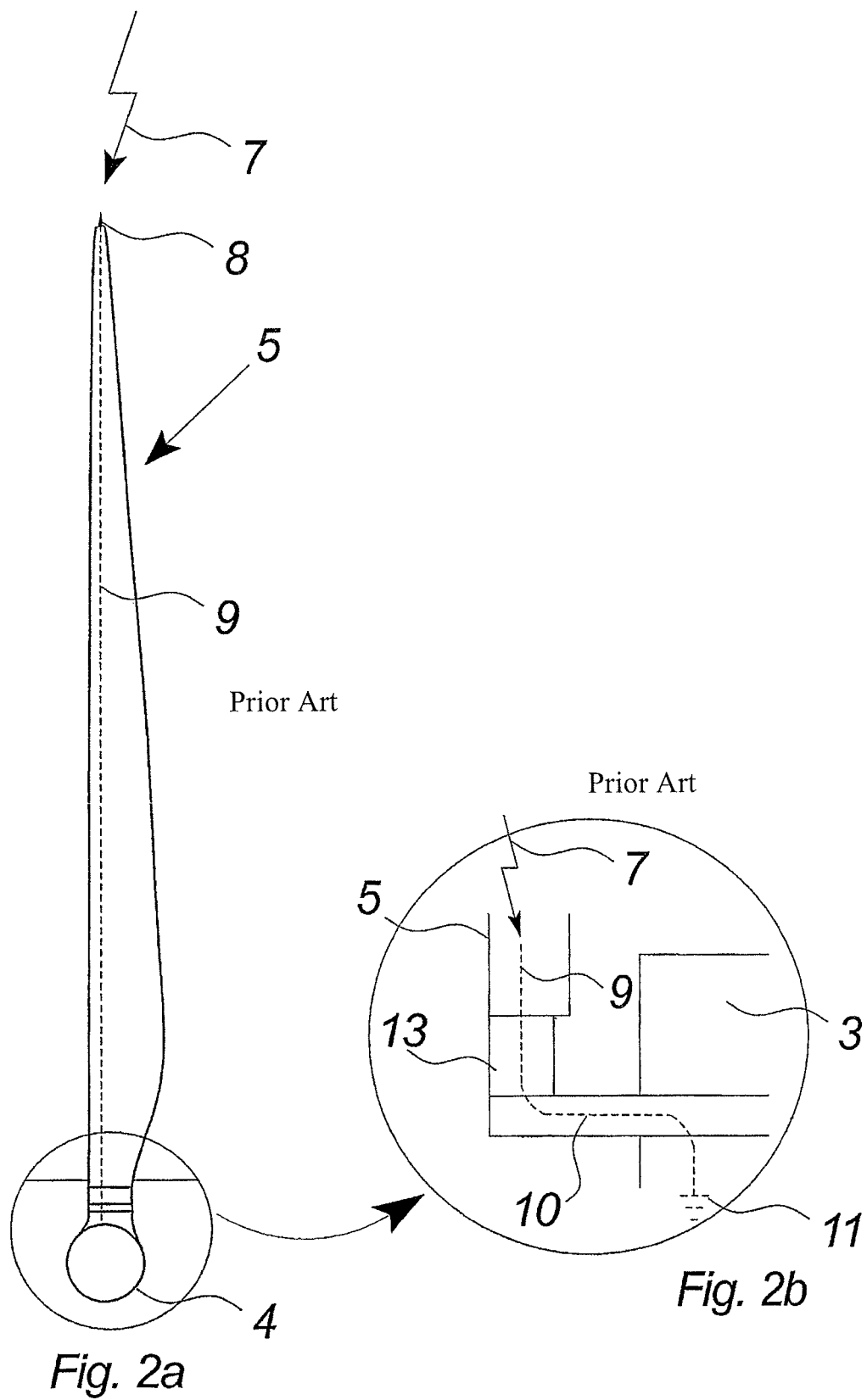
FIG. 2a (prior art) is a front view of a blade of the wind turbine of FIG. 1.
FIG. 2b (prior art) is a schematic of a known lightning current transfer unit.
Figure 3B:
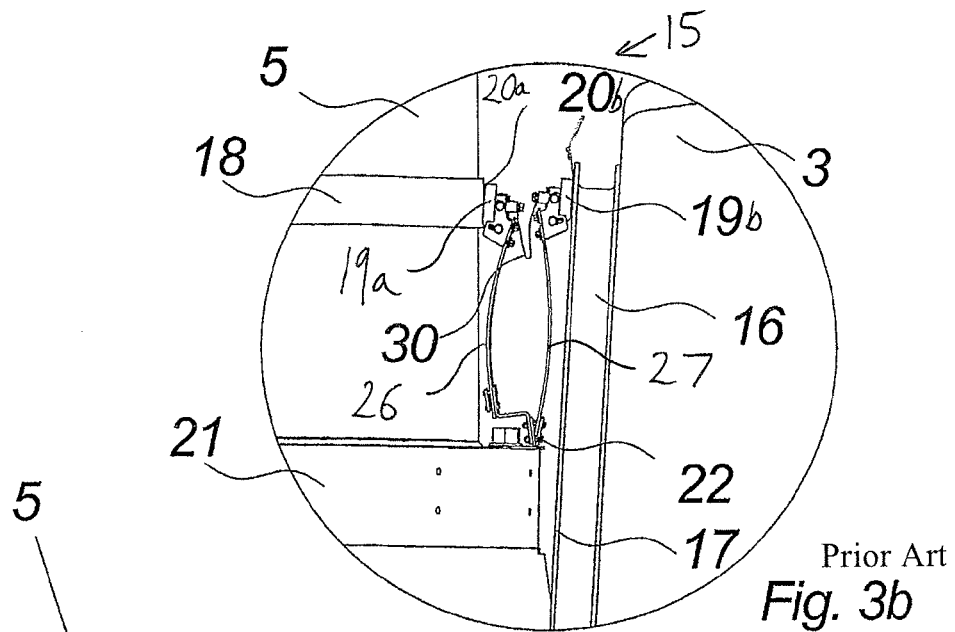
Figure 3A:
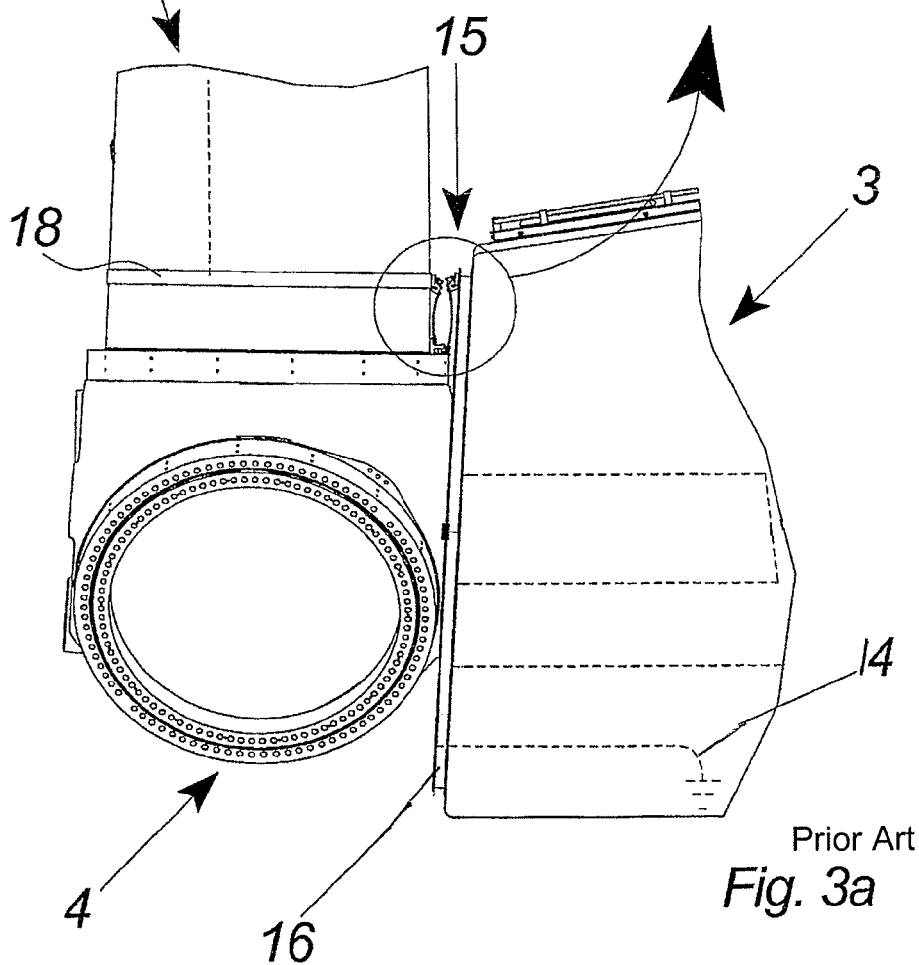
FIG. 3a (prior art) is a side view of a portion of a known wind turbine blade.
Figure 3C:
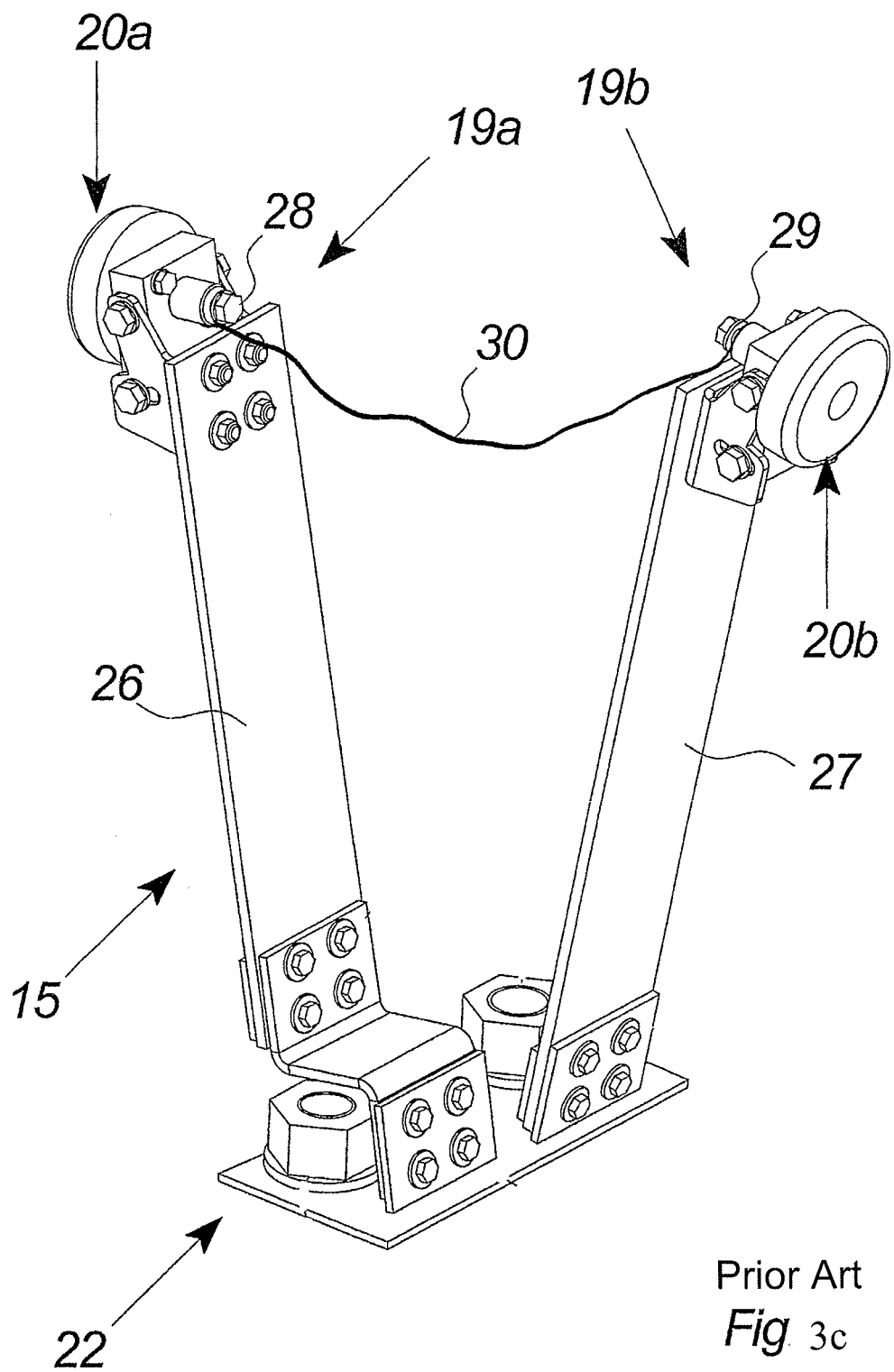
FIG. 3c (prior art) is a perspective view of a portion of FIG. 3b.
Figure 4:
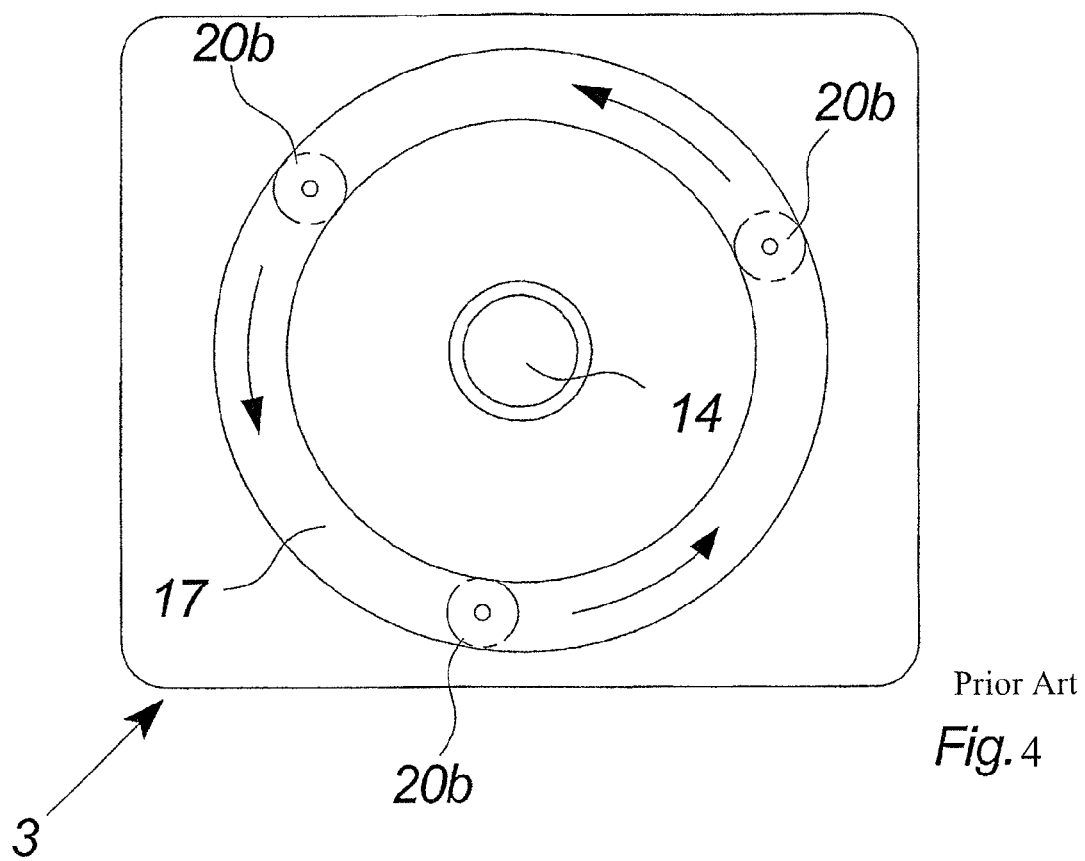
Figure 5:
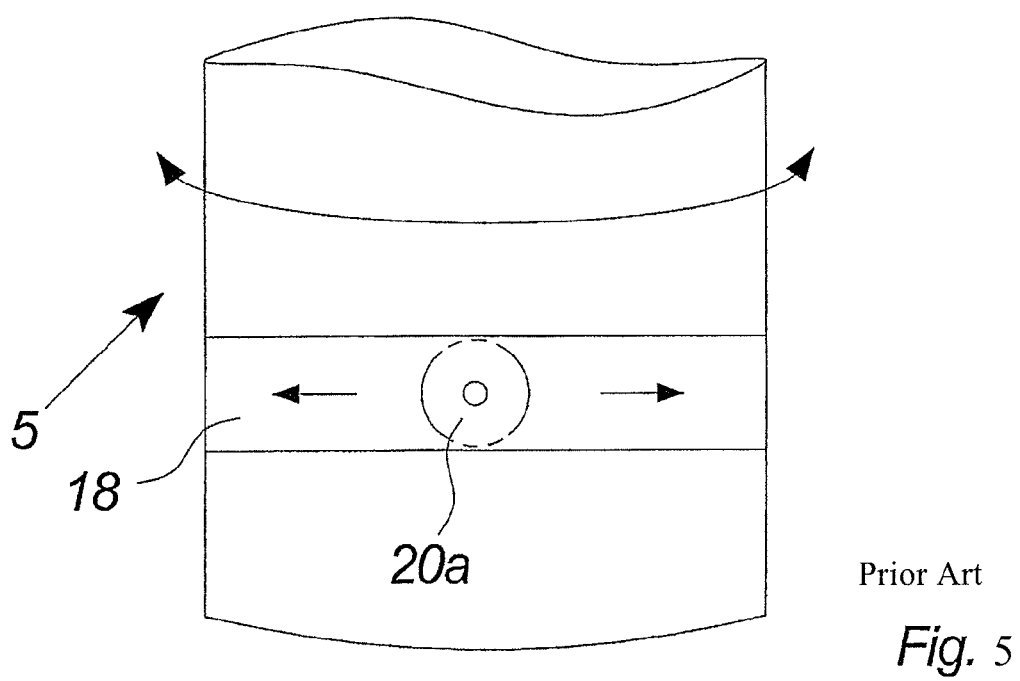
Figure 6:
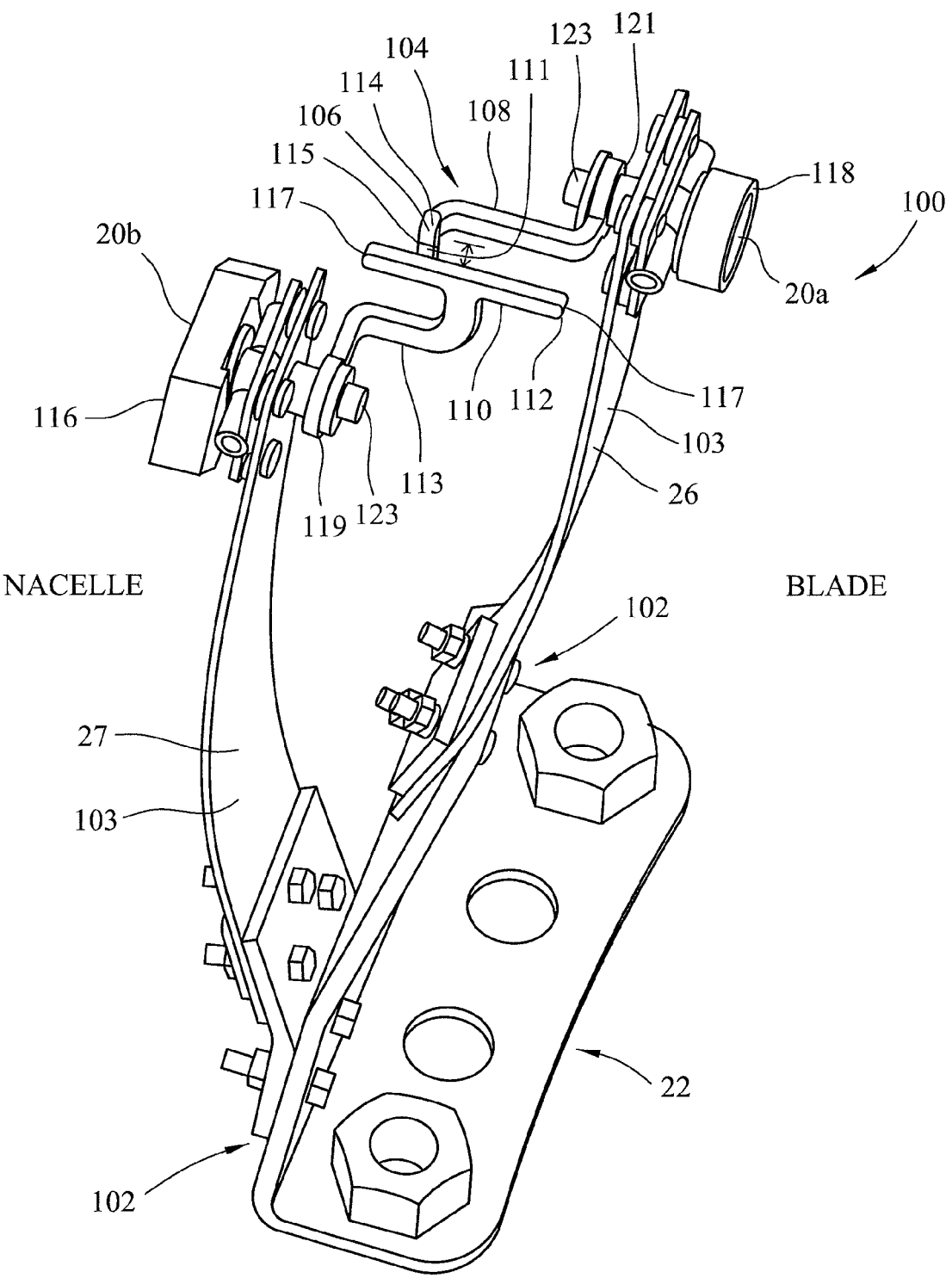
FIG. 6 is a perspective view of a lightning current transfer unit embodying an aspect of the present invention.

FIG. 6 illustrates a lightning current transfer unit 100 for a wind turbine embodying the present invention. It is similar in many respects to the prior art lightning current transfer unit 15 of FIGS. 3a to 5 and like features have been given like reference numerals. Like the lightning current transfer unit 15 of FIGS. 3a to 5 the lightning current transfer unit of FIG. 6 has a first portion or wear pad 20a configured to be electrically coupled to an electrically conducting portion 18 of a blade 5 or blade band of a wind turbine 1 (a conducting or metal ring around the root of the blade) electrically connected to a down conductor of the blade and a second portion or wear pad 20b configured to be electrically coupled to an electrically conducting portion of a nacelle 3 or lightning ring of the wind turbine 1 (an electrically conducting ring on the front of the nacelle facing the hub 4) connected to a down conductor connected to earth. The first portion and the second portion are both independently movable in two dimensions (in a curve) to maintain electrical coupling to the electrically conducting portion of the blade and nacelle respectively. Like the prior art lightning current transfer unit 15, the lightning current transfer unit 100 is mounted on a protruding portion 21 of the hub on the inside of the hub facing the nacelle and projects outwardly between the inside surfaces of the hub and nacelle in a space between the wind turbine blade and the front of the nacelle. The first portion and second portion are each located on a respective forcing arm 26,27 that forces the first portion against the electrically conducting portion of the blade and the second portion against the electrically conducting portion of the nacelle respectively. The forcing arms are located on the hub of the wind turbine. The force that forces the forcing arm is provided by a resilient portion of bent metal 102 of each of the arms located at the hub end of each of the arms. The forcing arms also include a rigid portion 103 of fibre reinforced plastics that extends from the resilient portion to the free end where the first and second portions are respectively connected.

Significantly, lightning current transfer unit 100 is distinguished over the prior art arrangement of FIGS. 3a to 5 by including a lightning current transfer portion 104 comprising a spark gap 106 formed between an electrical connection to the first portion in the form of an arm, spark arm or electrode (a first arm 108) and an electrical connection to the second portion also in the form of an arm, spark arm or electrode (a second arm 110).

Significantly, the electrical connections are moveable with their respective first or second portion. The spark gap has a spark gap distance 111 that is constant during movement of the first portion, the second portion and the electrical connections such that lightning current may be transferred from the first portion to the second portion. There is no cable connection in the LCTU. The spark gap is open. There is no direct contact between the first and second arms.

In this arrangement, there is plenty of space for the blast from a lightning strike to get away without causing damage. Thus, it expected that the spark gap sustains blasts from lightning passing through. Thus, the LCTU described is expected to have a life time of up to 20 years (the expected life of a wind turbine). Nevertheless, if there is damage from a lightning blast it is expected to result only in erosion of the spark arms without spark damage to the blade band or the lightning ring of the nacelle. Advantageously, the spark arms are readily replaceable. Furthermore, the space around the LCTU means that it is easy to inspect for damage. Given the similarity between prior art LCTUs particularly in the use of the same blade band, lightning ring of the nacelle and connection to the hub, the arrangement described herein is easy to implement on existing wind turbines.

In the example of FIG. 6, the first arm 108 has an edge portion 114 forming a tip in the form of a nub or bar 115 that forms an edge of the spark gap 106. The nub extends straight, slightly, towards and away from the hub. The first arm extends away from the nub of the edge portion, away from the spark gap 106, curves, then extends straight towards the blade, curves again before extending again in a direction away from the spark gap where it is connected to the first portion 20a through a through hole 121. The second arm 110 has an edge portion or bar 112 that projects between the blade and the nacelle forming the other edge of the spark gap. The free ends 117 of the bar are curved. The edge portion or bar has a body 113 extending from it forming a connector for connection to the second portion 20b. The connector extends firstly towards the hub, then curves and extends towards the nacelle and then curves again to extend perpendicular to these two directions where it is connected to the second portion through a through hole 119. The tip or nub 115 of the first arm 108 that projects towards the other edge portion is much narrower than the other edge portion or bar 112 of the second arm 110 forming the other edge of the spark gap. The shape of the arms reflects the tolerances of the LCTU. The spark gap distance 111 is the distance between the edges of the spark gap in a direction perpendicular to the edges. Typically, the spark gap distance is between 5 mm and 6 mm.

The first and second arms 108, 110 are mechanically and electrically connected to their respective portion 20a, 20b by a threaded fastener (a bolt) 123 passing through the through hole 119, 121 at the respective arm end and fastened to a complementary threaded hole in the first portion and second portion respectively. In contrast to the prior art arrangement, the second portion has a ship-shape or hexagonal face 116. Like the prior art arrangement, the first portion has a circular face 118.

In use, as the distance between the blade band and lightning ring of the nacelle changes, the first and second arms 108, 110 move relative to one another as the first and second portions 20a, 20b move as they are forced against their respective conducting portion (blade band or lightning ring). Importantly, as the arms forming the spark gap move relative to one another the spark gap distance 111, where lightning current is transferred or passed between them, is constant or is maintained.

Figure 9:
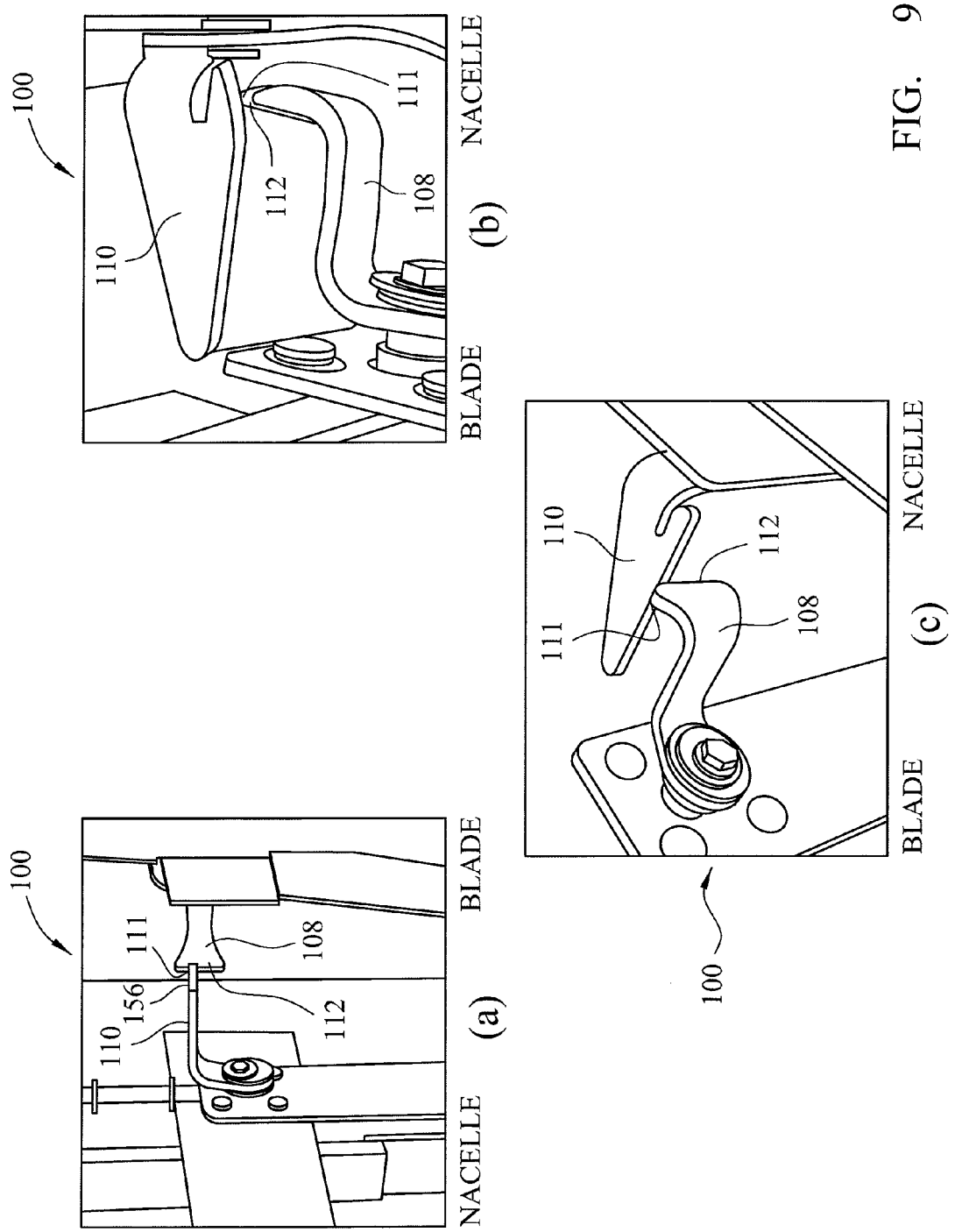
FIGS. 9a, 9b and 9c are different perspective views of a portion of a lightning current transfer unit embodying an aspect of the present invention in use.

Another arrangement of the first arm 108 and second arm 110 is shown in FIGS. 7, 8 and 9a to 9c. It is similar in many respects to the arrangement of FIG. 6 and like features have been given like reference numerals. FIGS. 7 and 8 illustrate the shape of the first arm and second arm respectively. FIGS. 9a to 9c illustrate the LCTU with this particular arm configuration in use.

In this example, the general configuration is the same as that of FIG. 6 in that the first arm 108 electrically coupled to the first portion 20a that is electrically coupled to the blade band forms a narrow edge to the spark gap and the second arm 110 electrically coupled to the second portion 20b that is electrically coupled to the lightning ring forms a long, straight edge to the spark gap. It is configured as follows.

The first arm 108, illustrated best in FIG. 7, on the blade side of the LCTU, that is connected to the first portion 20a (not shown in FIG. 7) is configured to be electrically coupled to an electrically conducting portion of the blade or blade band, has an edge portion 112 that is relatively narrow. It is narrower than the other edge portion 114 of the second arm 110 described below. It forms a tip. The edge portion projects towards the other edge portion forming another edge of the spark gap in the form of a nub 150 that extends, slightly, towards and away from the hub when in position on the wind turbine with sloped sides 152 (in contrast to the straight sides of the example of FIG. 6). In position on the wind turbine, the first arm of this example extends away from the nub of the edge portion, away from the spark gap, then bends towards the blade, before extending again in a direction away from the spark gap where it is connected to the first portion 20a through a through hole 119.

The second arm 110, illustrated best in FIG. 8, on the nacelle side of the LCTU, that is connected to the second portion 20b configured to be electrically coupled to an electrically conducting portion of the nacelle or lightning ring, has an edge portion, rail or sliding rail 114 that projects straight between the blade and the nacelle forming an edge of the spark gap. The edge 154 of the edge portion forming an edge of the spark gap is curved perpendicular to an axis between the blade and nacelle. The second arm has a free end 156 facing the blade when in position on the wind turbine. It widens towards the nacelle when in position on the wind turbine and then curves downwardly towards the hub where it is connected to the second portion 20b (not shown in FIG. 8) through a through hole 121. At the nacelle end of the second arm, there is a notch 158 between the edge portion and the connection to the second portion.

FIGS. 9a to 9c illustrate the LCTU 100 with the first and second arms 108, 110 of FIGS. 7 and 8 in use. In use, as described above, as the distance between the blade band and nacelle changes, the first and second arms move relative to one another as the first and second portions move as they are forced against their respective conducting portion (blade band or lightning ring). Importantly, as the arms forming the spark gap move relative to one another the spark gap distance 111, where lightning current is transferred or passed between them, is constant.

FIG. 9a shows the largest possible distance between the blade band and the sliding rail (second arm 110). That is to say, the narrow edge portion 112 of the first arm 108 is facing the free end 156 of the sliding rail or second arm. FIG. 9b shows the shortest possible distance between the blade band and the sliding rail. That is to say, the narrow edge portion of the first arm is facing the nacelle end of the sliding rail or second arm. FIG. 9c shows the narrow edge portion of the first arm is facing the middle of the sliding rail or second arm where it is generally located.

The invention has been described with reference to example implementations, purely for the sake of illustration. The invention is not to be limited by these, as many modifications and variations would occur to the skilled person. The invention is to be understood from the claims that follow.

The invention claimed is:

1. A lightning current transfer unit for a wind turbine, the lightning current transfer unit comprising:
   a first portion configured to be electrically coupled to an electrically conducting portion of a blade of a wind turbine electrically connected to a down conductor of the blade;
   a second portion configured to be electrically coupled to an electrically conducting portion of a nacelle of the wind turbine connected to a down conductor connected to earth;
   the first portion and the second portion both being independently movable to maintain electrical coupling to the electrically conducting portion of the blade and nacelle respectively; and
   a lightning current transfer portion comprising a spark gap formed between a first arm electrically connected to the first portion and a second arm electrically connected to the second portion, the first and second arms being configured to move with movement of their respective first and second portions such that the first and second arms are movable relative to one another,
   wherein the spark gap has a spark gap distance and the lightning current transfer portion is configured such that the distance is substantially constant during movement of the first portion and/or the second portion and such that lightning current is transferred from the first portion to the second portion.

2. The lightning current transfer unit according to claim 1, wherein the first arm or the second arm comprise a first edge portion projecting between the blade and nacelle forming an edge of the spark gap.

3. The lightning current transfer unit according to claim 2, wherein the other of the first arm or the second arm comprises a second edge portion projecting towards the first edge portion forming another edge of the spark gap.

4. The lightning current transfer unit according to claim 3, wherein the second edge portion is narrower than the first edge portion.

5. The lightning current transfer unit according to claim 3, wherein the spark gap distance is the distance between the edges of the spark gap in a direction perpendicular to the edges.

6. The lightning current transfer unit according to claim 1, wherein the spark gap distance is between 5 mm and 6 mm.

7. The lightning current transfer unit according to claim 1, wherein the first portion is located on a first forcing arm that forces the first portion against the electrically conducting portion of the blade.

8. The lightning current transfer unit according to claim 7, wherein the first forcing arm is located on a hub of the wind turbine.

9. The lightning current transfer unit according to claim 7, wherein the second forcing arm is located on a hub of the wind turbine.

10. The lightning current transfer unit according to claim 7, wherein the force that forces the first forcing arm is provided by a first resilient portion.

11. The lightning current transfer unit according to claim 10, wherein the first resilient portion is located at the hub end of the first forcing arm.

12. The lightning current transfer unit according to claim 7, wherein the force that forces the second forcing arm is provided by a second resilient portion.

13. The lightning current transfer unit according to claim 12, wherein the second resilient portion is located at the hub end of the second forcing arm.

14. The lightning current transfer unit according to claim 1, wherein the second portion is located on a second forcing arm that forces the second portion against the electrically conducting portion of the nacelle.

15. The lightning current transfer unit according to claim 1, wherein the first portion and the second portion are each movable in two dimensions.

\* \* \* \* \*